United States Patent
Königshaus

(10) Patent No.: US 7,019,476 B2
(45) Date of Patent: Mar. 28, 2006

(54) METHOD FOR RECOGNIZING AN OBSTRUCTIVE SITUATION IN A MOTOR DRIVEN ELEMENT

(75) Inventor: Markus Königshaus, Kamen (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 23 days.

(21) Appl. No.: 10/896,238

(22) Filed: Jul. 21, 2004

(65) Prior Publication Data
US 2005/0007053 A1    Jan. 13, 2005

Related U.S. Application Data

(63) Continuation of application No. PCT/EP03/01643, filed on Feb. 19, 2003.

(30) Foreign Application Priority Data
Feb. 21, 2002  (DE) ............................ 102 07 234

(51) Int. Cl.
*H02P 7/00*  (2006.01)

(52) U.S. Cl. ............... 318/280; 318/480; 318/446; 318/445; 318/466

(58) Field of Classification Search ........... 318/280, 318/480, 264, 283, 445, 466, 446
See application file for complete search history.

(56) References Cited

U.S. PATENT DOCUMENTS

| 5,734,244 A | 3/1998 | Lill et al. |
| 6,051,945 A | 4/2000 | Furukawa |
| 6,404,084 B1 * | 6/2002 | Niki et al. ............... 310/75 R |
| 6,504,332 B1 | 1/2003 | Lamm |

FOREIGN PATENT DOCUMENTS

| DE | 43 12 865 C2 | 11/1993 |
| DE | 195 14 257 C1 | 7/1996 |
| DE | 198 40 161 A1 | 3/2000 |
| DE | 198 40 164 A1 | 3/2000 |
| DE | 199 21 232 A | 11/2000 |
| DE | 199 41 475 A | 3/2001 |

* cited by examiner

Primary Examiner—Karen Masih
(74) Attorney, Agent, or Firm—Brooks Kushman P.C.

(57) ABSTRACT

A method for recognizing an obstructed situation of a traveling element. The method includes evaluating a variable containing information about the motor's rotational speed as the motor is driving the element. Starting from a current detection time point, the sequence of values of the variable determined at immediately preceding detection time points are observed. Change in behavior of the sequence of observed values of the variable with respect to one another over time are then compared with a value range of the variable that is indicative of the element being obstructed. A sufficient match between the value range of the variable and the sequence of observed values of the variable exists if at least three successive observed values of the variable fall within the variable value range. The element is determined to be obstructed upon the existence of a sufficient match. The variable includes the duration of motor time periods.

6 Claims, 2 Drawing Sheets

METHOD FOR RECOGNIZING AN OBSTRUCTIVE SITUATION IN A MOTOR DRIVEN ELEMENT

CROSS-REFERENCE TO RELATED APPLICATIONS

This is a continuation of International Application PCT/EP03/01643, published in German, with an international filing date of Feb. 19, 2003, and which claims priority to DE 102 07 234.5 filed Feb. 21, 2002.

BACKGROUND OF THE INVENTION

1. Field of the Invention

The present invention relates to a method for recognizing an obstructed situation of a motor-driven traveling element by evaluating a variable containing information about the rotational speed of the motor.

2. Background Art

Methods are used to detect obstructive situations of a motor-driven element such as an electric motor-driven element. Such obstructive situations occur, for example, when something is being pinched. Such methods are used, for example, to operate a window raising motor which closes a window in a motor vehicle. The methods are intended to ensure that objects, especially parts of a person's body, are not pinched in the closing window gap when the window is closed. The information about the rotational speed of the motor that is used for detecting obstructive situations is the motor period. The motor period is typically supplied by arranging a magnet having multiple poles in the peripheral direction on the armature shaft of the drive motor. The respective polarity is detected with a stationary Hall sensor or stationary Hall sensor arrangement.

It is possible to determine the rotational speed of the motor from the length of time a polarity is detected. This is because the length of time a polarity is detected is an analog signal representing the traversal of the motor through a certain rotational angle. If something is being pinched, the duration of the motor periods increase because the motor speed is reduced by the obstacle. To detect such an obstructed situation or such a case of pinching, the length of each detected motor period is compared with a predefined threshold value.

The magnitude of the threshold is chosen such that the threshold is not exceeded when the window makes a closing motion under normal conditions. This threshold, which is also called a cut-off value, being exceeded is indicative of pinching. To verify with greater probability that there actually is pinching when the cut-off value is exceeded, the durations (i.e., lengths) of a few more motor periods are evaluated. If the durations of these motor periods also exceed the cut-off value, it is concluded that there is pinching and the motor is reversed to lower the window.

Even if this method is fundamentally satisfactory at detecting cases of pinching when motor-driven windows in motor vehicles are closed, the system also concludes that a pinching situation is present in other cases whenever the above-mentioned conditions are met. These conditions are also met when the window is exposed to shocks when it is being closed such as which occur when driving through potholes on a rough road. Such erroneous reversals can be reduced by setting the cut-off value relatively high. However, if the recognition method has its cut-off value set too high, then it recognizes a case of pinching at a relatively late point in time.

SUMMARY OF THE INVENTION

Starting from the discussed prior art, the present invention is based on the task of further developing a method in such a way that an obstructed situation, for example a case of pinching when a motor-drive window is closed, is recognized at a point in time that is as early as possible without the disadvantage of having to accept a relatively low cut-off value.

The method in accordance with the present invention includes starting from a current time point, observing the values of the variable containing information about the rotational speed of the motor that are determined at the immediately preceding detection time points, and then comparing changes in their behavior with respect to one another over time with a value range for the observed variable that is typical for the obstructed situation.

In the method in accordance with the present invention, the system concludes that an obstructed situation is present when the values determined at the immediately preceding detection time points exhibit a change behavior with respect to one another over time that falls in a range of values of the observed variable that is typical for the obstructed situation to be recognized and that extends over several values. Thus, the method includes a sample comparison which involves recognizing the occurrence of an obstructed situation not on the basis of a threshold, but rather on the basis of the typical change behavior of the values determined when such an obstructed situation occurs. Such a sample comparison is able to recognize the actual presence of an obstructed situation with much greater accuracy.

For the case in which the method is used to operate an electric-motor driven window in a motor vehicle and to detect a case of pinching, the value range provided for comparison reconstructs such a pinching situation. Thus, the comparison value range represents typical evolution over time of the values determined from the variable containing information about the rotational speed of the motor, and it is intended to be used as a measure of the slowing of the motor's rotational speed that is occurring. Pinching can be recognized on the basis of a non-linear slowing of the motor's rotational speed, and thus from a motor period increasing in such a way that it reflects a spring-like rate of increase in force.

This method is also suitable to distinguish different obstructed situations from one another on the basis of different comparison value ranges representing different obstructed situation patterns resulting from a number of different obstacles. These different situations are characterized by different motor change protocols. This makes it possible to distinguish an actual pinching situation from an obstacle located in the window guide. It is then possible for the system to react in different ways depending on the obstructed situation detected, for example by reversing the drive motor in the case of pinching, by merely stopping the motor in another case, etc. This technique can also be used to detect when the window goes into the top weatherstrip.

In order to achieve a sufficient match between the comparison value range representing an obstructed situation and the sequence of currently determined values, it is sufficient for three succeeding currently determined values to be part of the value range defining the obstructed situation. However, for redundancy it is advantageous for the measure of a sufficient match to be five to seven succeeding currently determined values.

The values can be determined from the variable containing the information about the rotational speed on the basis of a force model which takes into consideration the system components and system parameters. Instead of a force model of the system, it is also possible to use an energy model, which can also be used to interpolate the next value(s) expected when an obstructed situation occurs.

BRIEF DESCRIPTION OF THE DRAWINGS

The present invention is described below using a sample embodiment, which refers to the attached figures. The figures are as follows.

DETAILED DESCRIPTION OF THE PREFERRED EMBODIMENT(S)

Figure 1:
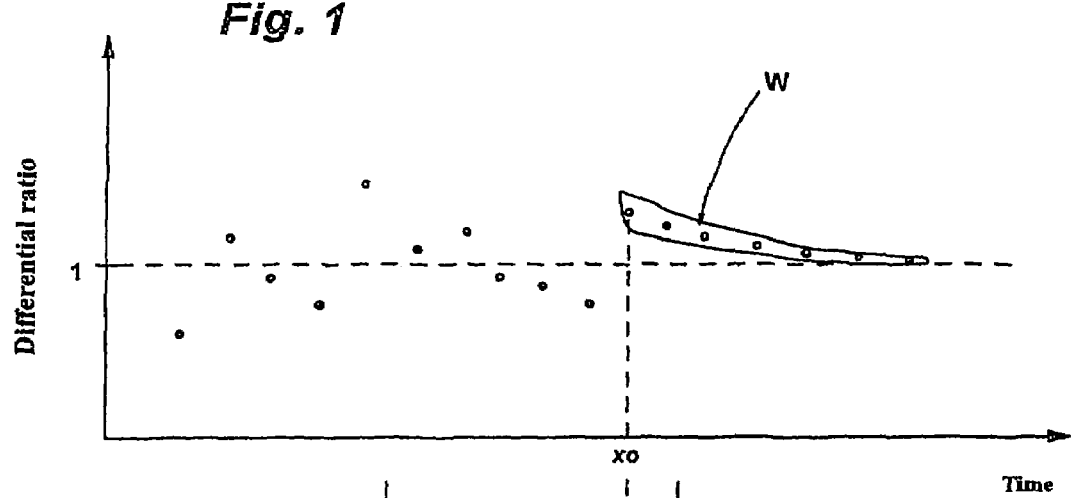
FIG. 1 illustrates a plot over time of the values determined from a variable containing information about the rotational speed of the motor when an obstructed situation occurs after operation of the motor under normal conditions.

The shaft 12 of an electric window raising motor 10 in a motor vehicle has arranged on it a magnet 14 having four poles in the peripheral direction. A Hall sensor arrangement 18 that is stationary to this magnet is used for detection of the respective magnet polarity that is applied to the Hall sensor. Thus, in this sample embodiment shown, rotation of the armature shaft by 360° is characterized by passing through four periods 20, referred to as motor periods T. Thus, the length of a motor period is a direct measure of the rotational speed of the window raising motor.

Figure 2:
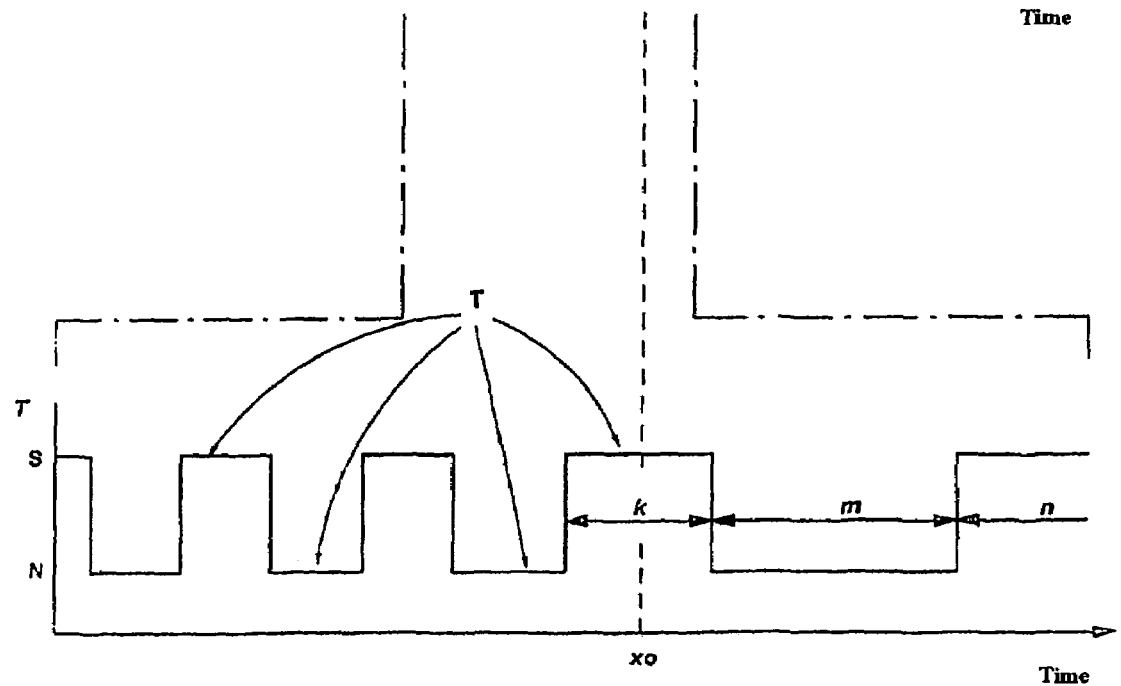
FIG. 2 illustrates a plot over time of the motor periods.
Figure 3:
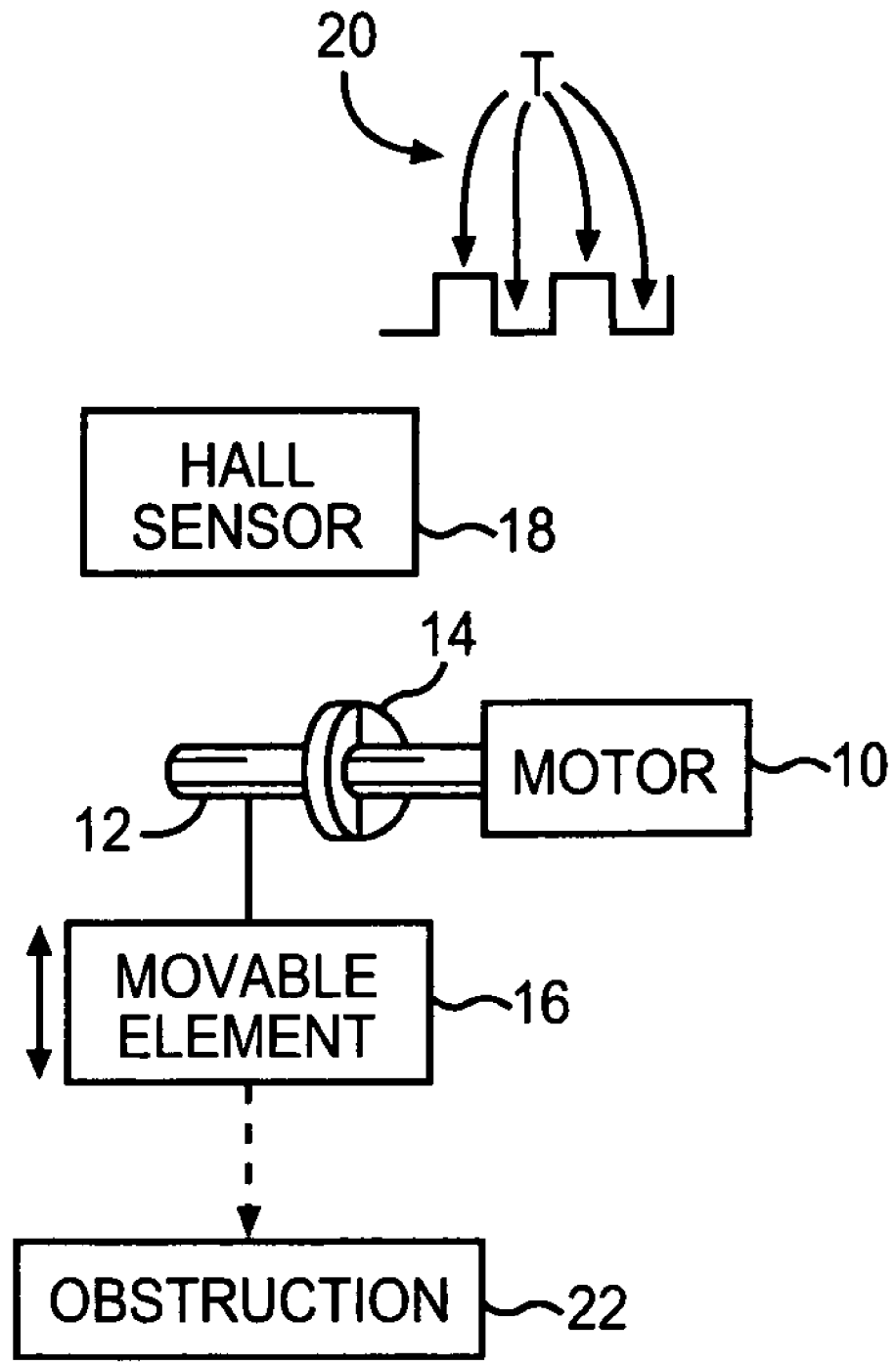
FIG. 3 illustrates a motor arrangement for driving a movable element in accordance with the present invention.

When the window 16 driven by the window raising motor is closed under normal conditions the window raising motor ideally rotates at a constant speed. In reality, however, this is subject to statistically distributed fluctuations. These fluctuations are not constant and are the result of the power transmission system and the friction of the window in its guide. Operation of the drive motor with constant rotational speed can be recognized in FIG. 2 by the constant duration (i.e., length) of the first motor periods T. At time point $x_0$, the window closing the window aperture touches an obstacle 22, which slows the window raising motor. This results in an increase in the duration of the motor periods T following time point $x_0$.

Using a force model as a basis for this sample embodiment, after each polarity change that is detected, that is after each motor period passes, the duration of the last motor period detected is stored in a ring buffer memory. The ring buffer memory has five memory locations, for example.

Using a simplified force model as a basis, the following relationship holds when the window is closed under normal conditions:

$$F_{tot}=F_M+F_g+F_F=0$$

where $F_{tot}$ is the total force, $F_M$ is the motor force, $F_g$ is the weight force of the window, and $F_F$ is the force of friction (all vector quantities). The weight force of the window and the force of friction ($F_g$ and $F_F$) are constants. The motor force $F_M$ is constant under normal operation so that a constant motor period T can be obtained (see FIG. 2).

At time point $x_0$ the window 16 runs into an obstacle 22, so that after that there is a change in force such that the original motor force $F_M$ is augmented by the elasticity of the object that was run into, which is expressed as an elastic force $F_E$ (a vector quantity), giving the following equation:

$$F_{tot}=F_M+F_E+F_g+F_F=\text{non-zero value}$$

The current motor period in which the window 16 runs into an obstruction 22 is prolonged according to the elastic force $F_E$. The subsequent motor periods are also prolonged, and this is by the force of the spring. This can also be expressed through the motor period which is constant before time point $x_0$ and which is prolonged by the pinching situation as a function of the elastic force.

After the constant factors are combined, this can be expressed as:

$$T=K+[B/(1-A*x)]$$

This description of the motor period behavior disregards the inertia of the window 16. However, in this case this is just exhausted, so that at the point where the window runs up against the obstacle 22 the spring constant that is to be determined appears lower at first, and then increases as the window is driven further into the obstacle.

The equation above has three unknown constants (K, B, A). These unknown constants can be determined from three interpolation nodes in a floating point calculation. However, because such a floating point calculation exceeds the power of a microcontroller that is used in practice today, in the sample embodiment shown it is the rise response of the motor period T that is evaluated. This evaluation involves examining the change behavior of several succeeding period duration measurements with respect to the preceding motor period according to the following equation (with reference to FIG. 2):

$$(Tm-Tn)/(Tk-Tm)=1$$

The statement resulting from this equation shows that if the simplified force model is used, then the differential quotient of three immediately succeeding motor periods is equal to 1 when there is pinching. This equation also makes clear that in the ideal case when the motor is at a constant rotational speed and thus the motor periods are constant this equation will be undefined. However, because this idealization does not occur in practice, the results are scattered, which produces clearly fluctuating differential quotients, such as are shown in FIG. 1 before time point $x_0$. The definition of pinching in this case as when the differential quotient is "1" gives the resulting differential quotients a typical behavior when there is pinching.

When pinching begins these differential quotients are somewhat greater than "1" due to the window's inertia (which is disregarded in the force model) and they gradually decrease with the detection of each further motor period and the differential quotients formed from it. Therefore, it is the last differential quotient determined that is stored in the ring buffer memory. FIG. 1 shows a value range W in which the differential quotients resulting when there is pinching are plotted. The individual differential quotients plotted in this value range W are provided with a tolerance band. Thus, if there is a pinching situation, it is necessary for the condition to be met that if two succeeding differential quotients are formed, the last is smaller than the one preceding it.

Moreover, it is possible to consider as a further criterion that the difference between the differential quotients of a first differential quotient pair formed from two succeeding differential quotients is greater than the difference between the differential quotients of another differential quotient pair formed from the last determined differential quotient of the first differential quotient pair and the differential quotient formed immediately afterwards. This case provides that five succeeding differential quotients have to meet these conditions in order to conclude that there is pinching.

The description of this method makes it clear that after a single calibration of the respective system, for example, a window-raising system in a motor vehicle, establishing the value range makes it simple to detect pinching with high certainty. It is true that driving on a rough road, which produces shocks on the closing window, is noticeable as a short-term change in the motor period. However, the resulting differential quotients do not satisfy the conditions mentioned, and therefore do not fall into the pattern described in FIG. 1, for example. Therefore, all forces acting on the window are disregarded which do not make themselves noticeable in a spring-like increase in force in the entire system.

The reason why is that this is the only circumstance under which it is possible to determine differential quotients which, in relation to the ones preceding them, satisfy the above-mentioned criteria for recognizing pinching. Because this is independent of the absolute force, this behavior is independent of the actual elastic force representing pinching. Thus, it is already concluded that there is a pinching situation when a small resistance with an effect like a spring acts on the window when it is being closed. This makes it possible to detect pinching at an early point in time; in this case, if five differential quotients satisfying the criteria are taken into consideration, pinching is already detected after the armature shaft has traversed an angle of 450°.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for recognizing an obstructed situation of a movable element being driven by a motor, the method comprising:
   evaluating values of a variable indicative of rotational speed of a motor at successive time points as the motor is driving a movable element;
   starting from a current time point, determining changes between a sequence of the variable values determined at immediately preceding time points over a given time interval;
   comparing the changes between the sequence of the variable values over the given time interval with a variable value change range for the given time interval, wherein the variable value change range for the given time interval represents a behavior of the variable value changes expected to occur during the given time interval when the element is in an obstructed situation;
   determining that the element is in an obstructed situation if the changes between the sequence of the variable values for the given time interval fall within the variable value change range for the given time interval; and
   determining that the element is in a non-obstructed situation if the changes between the sequence of the variable values for the given time interval fall outside of the variable value change range for the given time interval.

2. The method of claim 1 wherein:
the sequence of the variable values includes at least three variable values.

3. The method of claim 1 wherein:
the movable element is a motor vehicle window.

4. A method for recognizing an obstructed situation of a movable element being driven by a motor, the method comprising:
   evaluating durations of time periods of a motor at successive time points as the motor is driving a movable element;
   starting from a current time point, determining changes between a sequence of the motor time period durations determined at immediately preceding time points over a given time interval;
   comparing the changes between the sequence of the motor time period durations over the given time interval with a motor time period duration change range for the given time interval, wherein the motor time period duration change range for the given time interval represents a behavior of the motor time period duration changes expected to occur during the given time interval when the element is in an obstructed situation;
   determining that the element is in an obstructed situation if the changes between the sequence of the motor time period durations for the given time interval fall within the motor time period duration change range for the given time interval; and
   determining that the element is in a non-obstructed situation if the changes between the sequence of the motor time period durations for the given time interval fall outside of the motor time period duration change range for the given time interval.

5. The method of claim 4 wherein:
the sequence of the motor time period durations includes at least three motor time period durations.

6. The method of claim 4 wherein:
the movable element is a motor vehicle window.

* * * * *